United States Patent
Hessler

(10) Patent No.: US 10,348,526 B2
(45) Date of Patent: Jul. 9, 2019

(54) SUMMER SIGNAL STRENGTH BASED REFERENCE SIGNAL FILTERING

(71) Applicant: Telefonaktiebolaget LM Ericsson (publ), Stockholm (SE)

(72) Inventor: Martin Hessler, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/571,288

(22) PCT Filed: Oct. 2, 2017

(86) PCT No.: PCT/EP2017/075521
§ 371 (c)(1),
(2) Date: Nov. 2, 2017

(65) Prior Publication Data
US 2019/0109733 A1   Apr. 11, 2019

(51) Int. Cl.
*H04L 1/00* (2006.01)
*H04L 25/02* (2006.01)
*H04B 17/318* (2015.01)
*H04B 7/0452* (2017.01)
*H04L 5/00* (2006.01)

(52) U.S. Cl.
CPC ....... *H04L 25/0228* (2013.01); *H04B 7/0452* (2013.01); *H04B 17/318* (2015.01); *H04L 5/0048* (2013.01)

(58) Field of Classification Search
USPC .................. 370/208, 206, 210, 343
See application file for complete search history.

(56) References Cited

U.S. PATENT DOCUMENTS

| | | |
|---|---|---|
| 2012/0195397 A1 | 8/2012 | Sayana et al. |
| 2014/0269882 A1 | 9/2014 | Thompson et al. |
| 2017/0104610 A1 | 4/2017 | Lopez |

OTHER PUBLICATIONS

International Search Report and Written Opinion for International Patent Application No. PCT/EP2017/075521, dated Jun. 12, 2018, 14 pages.

*Primary Examiner* — Phuongchau Ba Nguyen
(74) *Attorney, Agent, or Firm* — Withrow & Terranova, PLLC

(57) ABSTRACT

For radio channel estimation, frequency-domain samples of a reference signal received by multiple antenna elements are obtained. The frequency-domain samples are converted to time-domain samples covering different time intervals. By removing phase information from the time-domain samples, the time-domain samples are converted to corresponding signal strength values. The signal strength values obtained for the multiple antenna elements are summed for each of the time intervals. At least one of the frequency domain samples and the time-domain samples are filtered based on the summed signal strength values. Radio channel estimation is then performed based on the filtered samples.

23 Claims, 7 Drawing Sheets ness, there is a need for techniques which allow
SUMMER SIGNAL STRENGTH BASED REFERENCE SIGNAL FILTERING This application is a 35 U.S.C. § 371 national phase filing of International Application No. PCT/EP2017/075521, filed Oct. 6, 2017, the disclosure of which is incorporated herein by reference in its entirety.

TECHNICAL FIELD

The present invention relates to methods for radio channel estimation and to corresponding apparatuses.

BACKGROUND

In wireless communication networks, it is known to use multiple-input multiple-output (MIMO) technologies for providing enhanced capacity and/or performance. For example, usage of a reciprocity based time division duplex (TDD) massive MIMO technology is being considered in the case of 5G ($5^{th}$ generation) mobile communication network.

Massive MIMO is a multi-user MIMO technology where each base station (BS) is equipped with a large number of antenna elements, typically 50 or more, which are used to serve many terminals that share the same time and frequency band and are separated in the spatial domain. One assumption in the massive MIMO technology is that there are more BS antennas than terminals, at least twice as many, but preferably even more. The massive MIMO technology offers many benefits over conventional multi-user MIMO. In the massive MIMO technology, the large excess of antennas over active terminals allows for enhanced beamforming performance and good scalability in view of served terminals.

By operating in TDD mode, the massive MIMO technology may utilize channel reciprocity, i.e., assume that radio channel characteristics are the same in both an uplink transmission direction from the terminal to the BS and a downlink transmission direction from the BS to the terminal. Channel reciprocity allows the BSs to acquire channel state information (CSI) from reference signals transmitted by the terminals in the uplink direction, e.g., from Sounding Reference Signals (SRS). This CSI may then be utilized for controlling beamforming both in the uplink direction and the downlink direction.

However, using reciprocity based beamforming in a massive MIMO technology typically requires high accuracy of the CSI acquired by the BS. On the other hand, performing channel estimation individually on each antenna element results in a very low signal to noise ratio (SNR) or signal to interference plus noise ratio (SINR), because there is no MIMO gain. It is thus a very demanding task to filter the contribution of the reference signal from a background of noise and interference.

Accordingly, there is a need for techniques which allow for efficient radio channel estimation based on a reference signal received by a large number of antennas.

SUMMARY

According to an embodiment of the invention, a method of radio channel estimation is provided. The method comprises obtaining frequency-domain samples of a reference signal received by multiple antenna elements. Further, the method comprises converting the frequency-domain samples to time-domain samples covering different time intervals. By removing phase information from the time-domain samples, the time-domain samples are converted to corresponding signal strength values. The signal strength values obtained for the multiple antenna elements are summed for each of the time intervals. At least one of the frequency domain samples and the time-domain samples are filtered based on the summed signal strength values, and radio channel estimation is performed based on the filtered samples.

According to a further embodiment of the invention, an apparatus for radio channel estimation is provided. The apparatus is configured to obtain frequency-domain samples of a reference signal received by multiple antenna elements. Further, the apparatus is configured to convert the frequency-domain samples to time-domain samples covering different time intervals. Further, the apparatus is configured to convert the time-domain samples to corresponding signal strength values by removing phase information from the time-domain samples. Further, the apparatus is configured to, for each of the time intervals, sum the signal strength values obtained for the multiple antenna elements. Further, the apparatus is configured to filter at least one of the frequency domain samples and the time-domain samples based on the summed signal strength values. Further, the apparatus is configured to perform radio channel estimation based on the filtered samples.

According to a further embodiment of the invention, a computer program or computer program product is provided, e.g., in the form of a non-transitory storage medium, which comprises program code to be executed by at least one processor of an apparatus. Execution of the program code causes the apparatus to obtain frequency-domain samples of a reference signal received by multiple antenna elements. Further, execution of the program code causes the apparatus to convert the frequency-domain samples to time-domain samples covering different time intervals. Further, Further, execution of the program code causes the apparatus to convert the time-domain samples to corresponding signal strength values by removing phase information from the time-domain samples. Further, execution of the program code causes the apparatus to, for each of the time intervals, sum the signal strength values obtained for the multiple antenna elements. Further, execution of the program code causes the apparatus to filter at least one of the frequency domain samples and the time-domain samples based on the summed signal strength values. Further, execution of the program code causes the apparatus to perform radio channel estimation based on the filtered samples.

Details of such embodiments and further embodiments will be apparent from the following detailed description of embodiments.

DETAILED DESCRIPTION OF EMBODIMENTS

In the following, concepts in accordance with exemplary embodiments of the invention will be explained in more detail and with reference to the accompanying drawings. The illustrated embodiments relate radio channel estimation in a radio technology using multiple antenna elements. In the examples as further detailed below the radio technology is assumed to be a massive MIMO technology applied in a wireless communication network, in particular a 5G mobile communication network. However, it is to be understood that channel adaptation according to the illustrated concepts could also be applied in other application scenarios.

Figure 1:
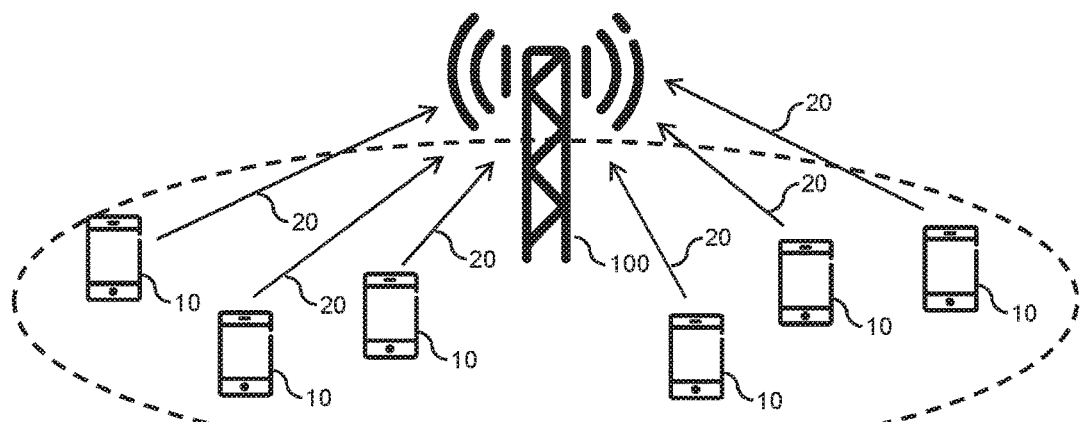
FIG. 1 schematically illustrates a transmission of reference signals in a massive MIMO scenario in which radio channel estimation is performed according to an embodiment of the invention.

In the illustrated examples, it is assumed that radio channel estimation is performed on the basis of a reference signal received by multiple antenna elements. An example of a corresponding scenario is illustrated in FIG. 1, where an access node 100 of the wireless communication network, e.g., a base station, receives reference signals 20 from a plurality of terminals 10. The terminals 10 may for example correspond to mobile phones, portable or stationary computer systems, machine-type communication (MTC) devices, or various other kinds of device supporting connectivity to the wireless communication network. The access node 100 receives the reference signals 20 via multiple co-located antenna elements (not illustrated in the figure). The number of antenna elements is significantly larger than the number of the terminals 10. For example, the number of the antenna elements could be 50 or more, typically 100 or more, or even more than thousand. Further, multiple antenna elements could also be used in the terminals 10. The reference signals 20 may for example correspond to SRS. The reference signals 20 from different terminals 10 may be based on different orthogonal signal sequences, e.g., Chadoff-Zhu sequences.

Figure 2:
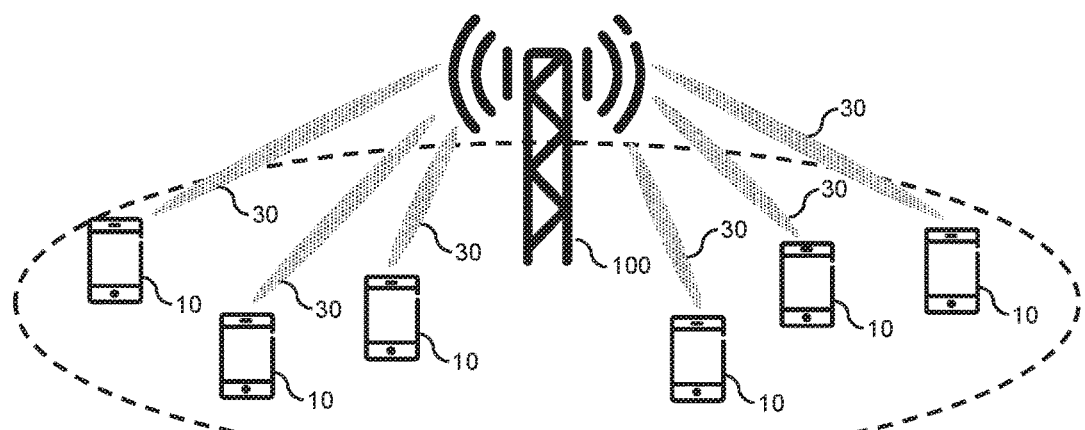
FIG. 2 schematically illustrates MIMO channels formed in the MIMO scenario of FIG. 1.

By measuring the reference signals 20, the access node 100 determines estimates of a radio channel between the access node 100 and each terminal 10 and controls beamforming for radio transmissions between the access node 100 and the respective terminal 10 on the basis of these radio channel estimates. Corresponding focused transmission beams 30 are illustrated in FIG. 2. As can be seen, the massive MIMO technology allows for aggressive spatial multiplexing of the terminals 10. This may be achieved by appropriately shaping signals transmitted from the access node 100 to the respective terminal 10 and signals received by the access node 100 from the respective terminal 10. By adjusting a precoding pattern applied to the antenna elements, the access node 100 may obtain constructive interference of transmitted signals at the location of a given terminal 10 and destructive interference at other locations.

In the example of FIG. 2, the reference signals 20 are transmitted in the uplink direction from the terminals 10 to the access node 100. The radio access node 100 may use the radio channel estimates obtained on the reference signals for controlling the beamforming in both the uplink direction and in the downlink direction. That is to say, the control of beamforming may assume channel reciprocity. This assumption is typically valid if the radio technology is based on TDD. However, it is noted that in some cases the assumption of channel reciprocity could also be a applicable in other scenarios, e.g., if the radio technology is based on FDD (Frequency Division Duplex) on close frequency channels or on simultaneous bi-directional full duplex communication on the same frequency channel.

In the illustrated concepts, estimation of the radio channel involves estimation of a noise contribution in samples of the received reference signal and filtering the samples of the received reference signal based on the estimated noise contribution. In this way, samples may be disregarded which represent noise. The noise contribution may be estimated by conversion of the samples to absolute amplitude or power values in the time domain, and to summation of these amplitude or power values over the antenna elements. As a result, an overall signal strength value can be obtained for different time intervals. A low overall signal strength value is indicative of the samples corresponding to the time interval representing noise. A high overall signal strength value is indicative of the samples corresponding to the time interval including valuable reference signal information. Accordingly, the summed signal strengths can be used for adjusting a time-domain or frequency-domain filter which allows for filtering out at least a part of the noise contribution. This filter may then be applied to all antenna elements.

Figure 3:
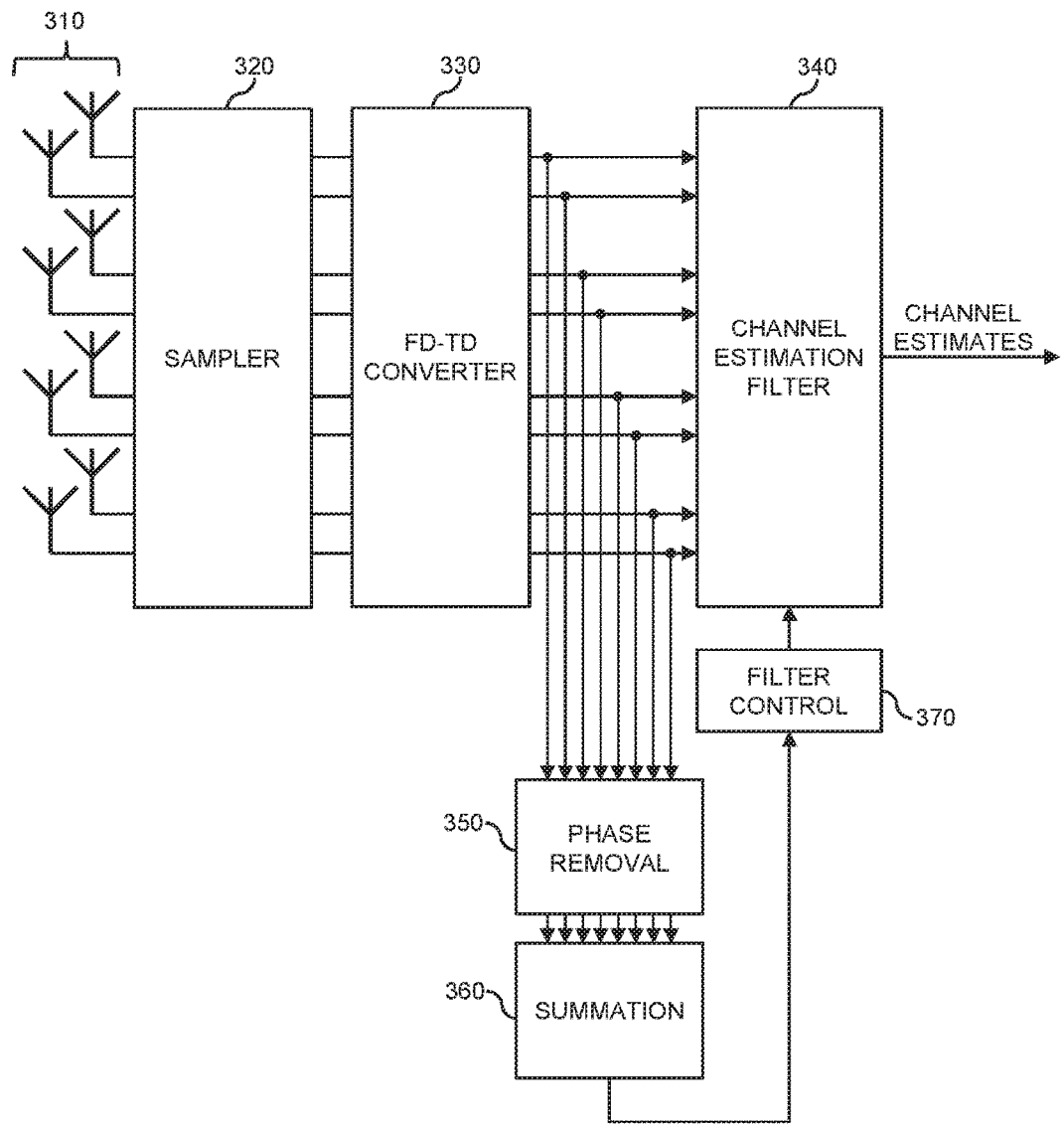

FIG. 3 shows a block diagram for schematically illustrating the principles of radio channel estimation as outlined above. Elements and functionalities as illustrated in FIG. 3 may for example be implemented in the access node 100.

By way of example, FIG. 3 illustrates a plurality of antenna elements 310. Here, it is noted that while in FIG. 3 the number of antenna elements is eight, a significantly larger number of antenna elements could be used in practical implementations, e.g., more than 50 antenna elements, typically 100 or more antenna elements, or even more than thousand antenna elements.

As illustrated, signals received by the antenna elements 310 are provided to a sampler 320. Based on the received signals, the sampler 320 generates frequency-domain samples representing a raw channel estimate obtained by correlating the measured signals to the reference signal to be measured. The raw channel estimate indicates a deviation of the received signal from the reference signal in terms of amplitude and phase. Accordingly, the frequency domain samples include amplitude information and phase information.

The frequency-domain samples are provided to a frequency-domain (FD) to time-domain (TD) converter 330 which converts the frequency-domain samples to time-domain samples. The time-domain samples represent amplitude and phase information and each correspond to a certain time interval, in accordance with a time of arrival of the signal at the respective antenna element. For converting the frequency-domain samples, the FD-TD converter may apply an Fast Fourier Transform (FFT), an inverse FFT (IFFT), a Discrete Cosine Transform (DCT), or an inverse DCT (IDCT) to the frequency-domain samples.

The time-domain samples are then provided to a channel estimation filter 340 which selects relevant time-domain samples, also referred to as channel taps, and determines a channel estimate for each of the antenna elements from the relevant time-domain samples. Operation of the channel estimation filter 340 may involve applying a common filter window to the time-domain samples and/or assigning weights to the time-domain samples.

For adjusting the channel estimation filter 340, the time-domain samples are also supplied to phase removal block 350, which removes the phase information from the time domain samples. For this purpose, the phase removal block 350 may convert the time-domain samples to signal strength values, e.g., to signal amplitude values or to signal power values.

Accordingly, the phase removal block provides an absolute signal strength value for each of the antenna elements 310 and for each of the time intervals covered by the time-domain samples, in the following denoted by $p_{k,n}$, where k is an index denoting the respective antenna element 310 and n is an index denoting the time interval.

The signal strength values are provided to a summation block 360. For each of the time intervals the summation block 360 sums the signal strength values $p_{k,n}$ n over the different antenna elements, i.e., calculates an overall signal strength $P_n$ according to:

$$P_n = \Sigma_k p_{k,n} \quad (1)$$

Accordingly, the summation block 360, for each of the time intervals, the summation block provides an overall signal strength $P_n$ corresponding to the summed signal strengths $p_{k,n}$ obtained for the different antenna elements 310.

The overall signal strengths $P_n$ are provided to filter control block 370. The filter control block 370 uses the overall signal strengths to adjust the channel estimation filter 340. This may involve setting of a time-domain filter window. For example, the filter control block 370 may set a contiguous filter window including all the time intervals for which the overall signal strength $P_n$ indicates that the corresponding time-domain samples constitute relevant channel taps, i.e., do not represent noise. This can be accomplished on the basis of well-known statistical methods for assessing the quality of data, e.g., on the basis of the Akaike information criterion.

Further, the filter control block 370 could set the filter window based on a comparison of the overall signal strengths to a threshold value. For example, the filter window could be defined to capture all the time intervals for which the overall signal strength $P_n$ exceeds a threshold value.

The threshold value could be derived from the overall signal strengths $P_n$, e.g., based on a minimum value of the for which the overall signal strengths $P_n$. The threshold value could for example be determined by scaling the minimum value with a factor S and/or adding an offset R, e.g., to calculate the threshold T value according to $$T = S \cdot \min_n(P_n) + R, \quad (2)$$

where $S \geq 1$ and $R \geq 0$. This calculation can also be performed in logarithmic domain, e.g., by using overall signal strengths $P_n$, and optionally the offset in dB units. The factor S and the offset R may be determined in an empiric manner.

Further, the filter control block 370 could set the filter window based on percentile values of the overall signal strengths $P_n$. For example, the overall signal strengths $P_n$ up to the $50^{th}$ percentile, i.e., the 50% smallest overall signal strengths $P_n$, could be used to estimate a noise level. A reliability of this estimate could be considered by averaging over the number of antenna elements. This noise level may define a threshold value and the filter window could be defined to capture all the time intervals for which the overall signal strength $P_n$ exceeds the threshold value. Further, multiple percentile values may be used to determine the threshold as a variable function.

Further, the filter control block may set the filter window in relation to the cyclic prefix duration and/or the portion of a time domain response corresponding to a number of occupied cyclic shifts of the reference signal. A time-domain filter window can be used which is shorter than the cyclic prefix and/or shorter than a time interval defined by the number of cyclic shifts. Since the time interval defined by the number of cyclic shifts shift typically is larger than the cyclic prefix duration, selecting a time-domain filter window which is shorter than the cyclic prefix duration also allows for meeting constraints imposed by the number of cyclic shifts used in the reference signal.

In the following, an exemplary process of selecting time-domain samples will be explained in more detail. In this example, it is assumed that the filter control block 370 applies the above option of setting the filter window on the basis of percentile values of the overall signal strengths $P_n$.

In this example, the filter control block 370 first sorts the overall signal strengths $P_n$ in increasing order to obtain a sorted list and determines a low percentile value $P_L$ and a high percentile value $P_H$ from the sorted list of the overall signal strengths $P_n$. In this example, the low percentile value $P_L$ is the $10^{th}$ percentile and the high percentile value $P_H$ is the $50^{th}$ percentile. However, it is noted that other percentile values could be used as well. The filter control block 370 may then determine the threshold value as a linear function of an ordinal rank m of the overall signal strengths $P_n$ in the sorted list, e.g., according to:

$$T(m) = P_H(1 + a/(1 + b \cdot K^{0.5})) + /(m - m_H)/(m_H - m_L) \cdot (P_H - P_L). \quad (3)$$

where a and b are parameters which may be set according to empiric data, K is the number of the antenna elements, and $m_L$ denotes the ordinal rank of the low percentile value $P_L$ and $m_H$ denotes the ordinal rank of the high percentile value $P_H$. In the illustrated example, the parameter a was set to a=10 and the parameter b was set to b=5.6. The filter block 370 may then set the minimum sized contiguous filter window including those time intervals which fulfil the condition:

$$P_n(m) > T(m). \quad (4).$$

Figure 4A:
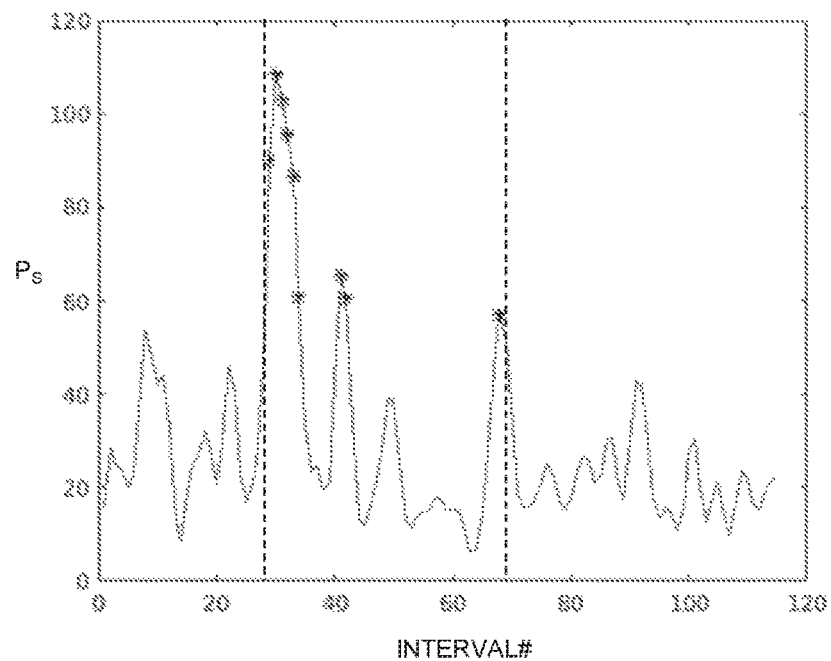
FIGS. 4A and 4B show exemplary data for illustrating selection of time domain samples according to an embodiment of the invention.
Figure 4B:
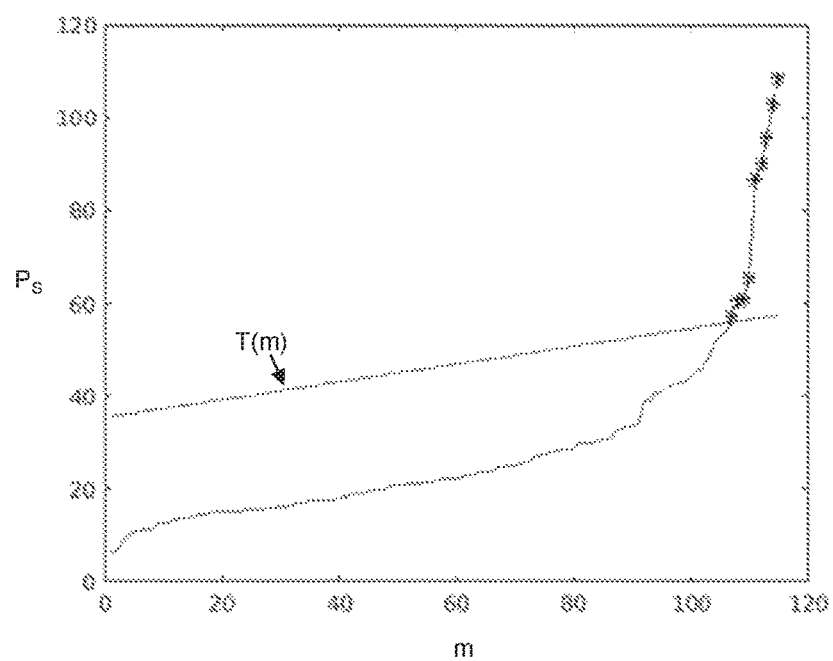
Figure 5A:
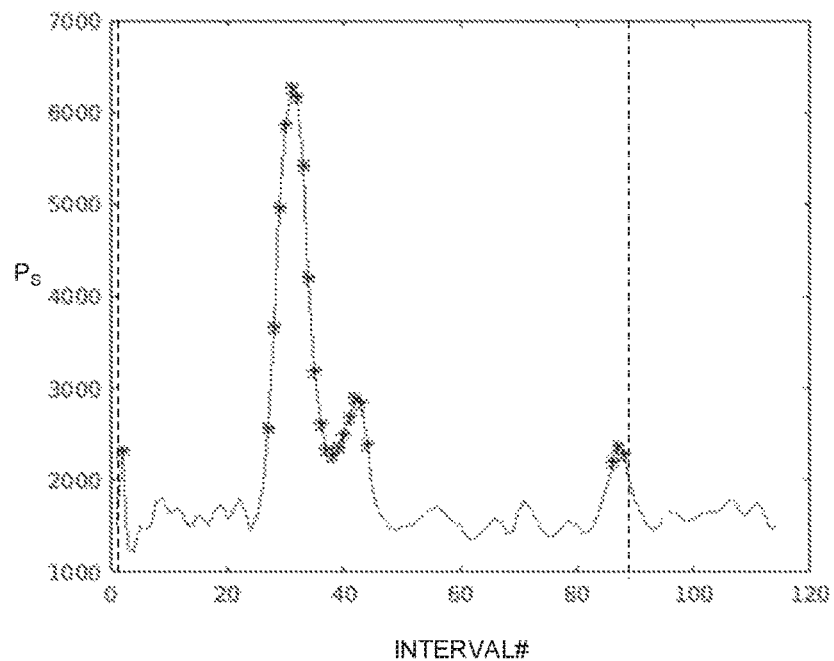
FIGS. 5A and 5B show exemplary data for illustrating selection of time domain samples according to an embodiment of the invention.
Figure 5B:
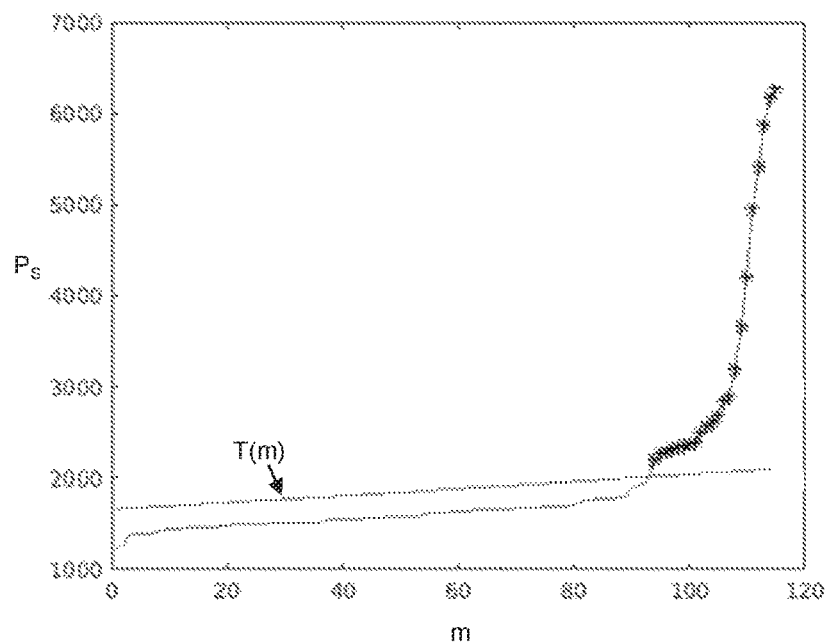

FIGS. 4A and 4B show simulation results obtained for a channel model with spatial correlations and assuming that the number of antenna elements is K=2. FIG. 4A illustrates the overall signal strengths $P_n$ as a function of the time interval number. FIG. 4B shows the sorted overall signal strengths $P_n$ as a function of the ordinal rank m in the sorted list. FIGS. 5A and 5B show simulation results obtained for a channel model with spatial correlations and assuming that the number of antenna elements is K=128. FIG. 5A illustrates the overall signal strengths $P_n$ as a function of the time interval number. FIG. 5B shows the sorted overall signal strengths $P_n$ as a function of the ordinal rank m in the sorted list. In each of FIGS. 4A, 4B, 5A, and 5B, the time intervals including time-domain samples known to be relevant are marked by star symbols.

FIGS. 4B and 5B also illustrates the threshold value T(m) which varies as a linear function of the ordinal rank m. The boundaries of the contiguous filter window which may be set by the filter control block 370 are illustrated by dashed vertical lines.

As can be seen from FIGS. 4A and 5A, the time intervals including the relevant time-domain samples correspond to peaks of high overall signal strength $P_n$. The threshold value T(m) allows for picking the time intervals including the relevant time-domain samples in an accurate manner. Specifically, by selecting only the samples from the time intervals which fulfil the condition (4), it is possible to capture all relevant time-domain samples, while disregarding most other samples as representing noise. Setting a contiguous filter window which includes the time intervals which fulfil the condition (4) thus allows for achieving significantly enhanced SNR/SINR for the channel estimation by the channel estimation filter 340.

It is noted that as an alternative or in addition to providing the time-domain samples to the channel estimation filter 340, like illustrated in FIG. 3, the channel estimation filter 340 could also filter and process the frequency-domain samples in order to obtain the radio channel estimates. In this case, the frequency-domain samples could additionally be provided directly to the channel estimation filter 340, bypassing the FD-TD converter 330.

It is also noted that for typical antenna configurations, the time positions of the channel taps are substantially static. When for example assuming a sample rate of 30.72 MHz, the spacing of two adjacent time-domain samples corresponds to a distance of about 10 m, which is much larger than a typical antenna. For typical movements of a terminal 10 between two subsequent occasions of transmitting the reference signal, the relevant time-domain samples will therefore in most likely be located in the same time interval. Further, usage of a contiguous time-domain filter window ensures that in most cases also adjacent time intervals are captured by the filter window and the relevant time-domain samples still considered. Consequently, the adjustment of the filter window can be controlled on a time scale which is longer than a period of transmissions of the reference signal. Further, also when calculating a SVD from the filtered time-domain samples, a common filter window for all antenna elements 310 ensures that the same channel taps are available for each antenna element. This facilitates capturing the eigenvectors of the radio channel, i.e., spatial directions corresponding to the channel taps.

Figure 6:
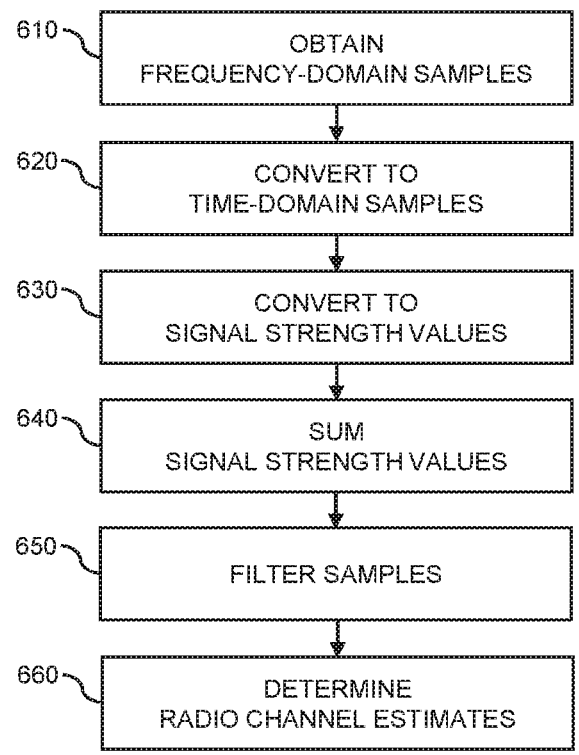
FIG. 6 shows a flowchart for schematically illustrating a method according to an embodiment of the invention.

FIG. 6 shows a flowchart for illustrating a method of radio channel estimation. The method of FIG. 6 may be utilized for implementing the illustrated concepts in a channel estimation apparatus. Such channel estimation apparatus may for example correspond to the above-mentioned access node 100 or to a component of the access node 100. However, it is noted that such channel estimation apparatus could also be implemented separately from the access node 100.

At step 610, frequency-domain samples of a reference signal received by multiple antenna elements are obtained. These frequency-domain samples may for example be generated by receiving signals by the multiple antenna elements and correlating the received signals to the reference signal as expected to be received. The frequency-domain samples may for example correspond to raw radio channel estimates representing deviations of the received signals from the expected reference signal in terms of amplitude and phase.

At step 620, the frequency-domain samples are converted to time-domain samples covering different time intervals. This conversion may be accomplished by applying an FFT, an IFFT, a DCT, or an IDCT to the frequency-domain samples. Like the frequency-domain samples, the time-domain samples each include amplitude and phase information.

At step 630, the time-domain samples are converted to corresponding signal strength values. This conversion is accomplished by removing the phase information from the time-domain samples. The signal strength values may for example correspond to signal amplitude values without any phase information or to signal power values. As a result, a signal strength value is obtained for each of the antenna elements and for each of the time intervals.

At step 640, the signal strength values obtained for the multiple antenna elements are summed. This is accomplished individually for each of the time intervals, e.g., according to equation (1). As a result, an overall signal strength value, corresponding to the signal strength values summed over the different antenna elements, is obtained for each of the time intervals.

At step 650, at least one of the frequency-domain samples and the time-domain samples is filtered. The filtering is accomplished based on the summed signal strength values obtained at step 640. For example, a filter window may be set based on the summed signal strength values, and the frequency-domain samples or the time-domain samples may be filtered based on this filter window. The same filter window may be used for each of the antenna elements. As a result, filtered samples are obtained for each of the antenna elements.

In some scenarios, the filtering may involve determining a threshold value based on the summed signal strengths. Filtering of the time-domain samples may then involve selecting the time-domain samples corresponding to those of the time intervals for which the summed signal strength values exceed the threshold value. In this case, the filtering may also involve determining a time-domain filter window which captures the time intervals for which the summed signal strength values exceed the threshold value. The time-domain window may be contiguous. The determined time-domain filter window may also depending on a duration of a cyclic prefix of the reference signal and/or on a number of cyclic shifts of the reference signal.

In some scenarios, the threshold value may be variable. In particular, the summed signal strength values may be sorted and the threshold value may be determined as a function of an ordinal rank of the sorted summed signal strength values. Accordingly, with increasing summed signal strength value, also a higher threshold value could be applied. The threshold value may be determined as a linear function of the ordinal rank of the sorted summed signal strength values, e.g., according to equation (3). However, more complex functional dependencies could be utilized as well.

In some scenarios, the threshold value may be determined on the basis of at least one percentile value of the sorted summed signal strength values. For example, a low percentile value and a high percentile value could be used to adjust a linear dependency of the threshold value on the ordinal rank, e.g., according to equation (3).

When determining the threshold value, other parameters may be considered as well. For example, the threshold value could be determined depending on a number of the antenna elements. The number of antenna elements may be used for averaging, e.g., like in equation (4). Further, the threshold value could also be determined depending also a minimum value of the summed signal strength values could be considered, e.g., according to equation (2).

Further, various other parameters based on empiric data could be considered when determining the threshold value.

At step 660, radio channel estimation is performed based on the filtered samples. As a result, a radio channel estimate may be obtained for each of the antenna elements. These radio channel estimates may then be used for controlling radio transmissions, e.g., with respect to beamforming. For example, the radio channel estimates may be used for controlling the transmission beams 30 like illustrated in FIG. 2.

Figure 7:
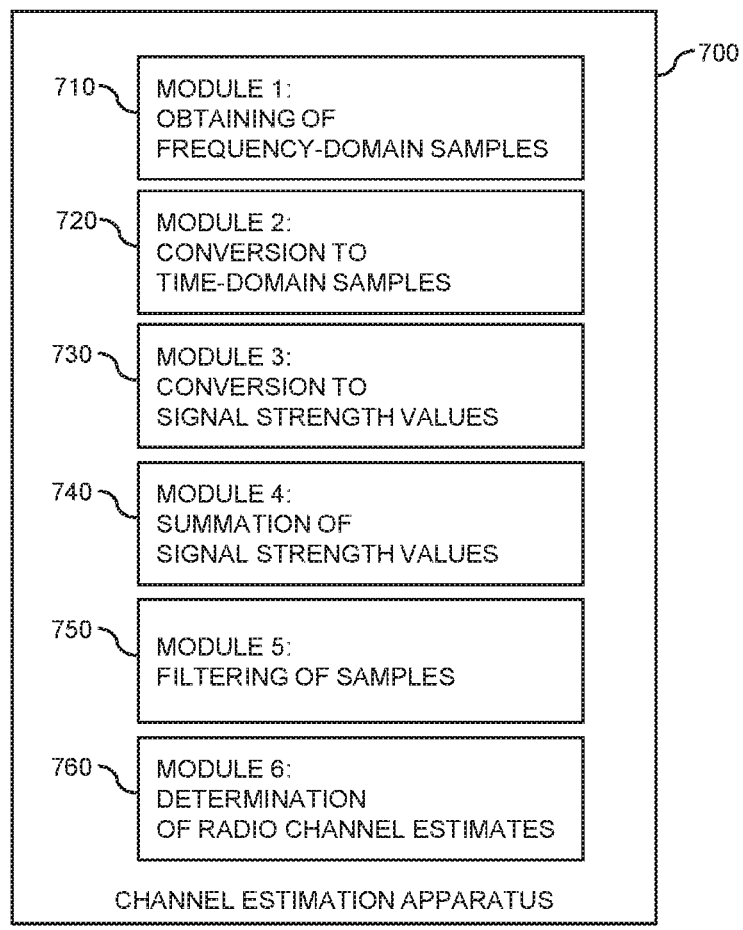
FIG. 7 shows a block diagram for illustrating functionalities of a radio channel estimation apparatus according to an embodiment of the invention.

FIG. 7 shows a block diagram for illustrating functionalities of a radio channel estimation apparatus 700 which operates according to the method of FIG. 6. As illustrated, the radio channel estimation apparatus 700 may be provided with a module 710 configured to obtain frequency-domain samples of a reference signal, such as explained in connection with step 610. Further, the radio channel estimation apparatus 700 may be provided with a module 720 configured to convert the frequency-domain samples to time-domain samples, such as explained in connection with step 620. Further, the radio channel estimation apparatus 700 may be provided with a module 730 configured to convert the time-domain samples to signal strength values without phase information, such as explained in connection with step 630. Further, the radio channel estimation apparatus 700 may be provided with a module 740 configured to sum the signal strength values, such as explained in connection with step 640. Further, the radio channel estimation apparatus 700 may be provided with a module 750 configured to filter the frequency-domain samples and/or the time-domain samples based on the summed signal strength values, such as explained in connection with step 650. Further, the radio channel estimation apparatus 700 may be provided with a module 760 configured to perform channel estimation based one the filtered samples, such as explained in connection with step 660.

It is noted that the radio channel estimation apparatus 700 may include further modules for implementing other functionalities, such as known functionalities of an access node. Further, it is noted that the modules of the radio channel estimation apparatus 700 do not necessarily represent a hardware structure of the radio channel estimation apparatus 700, but may also correspond to functional elements, e.g., implemented by hardware, software, or a combination thereof.

Figure 8:
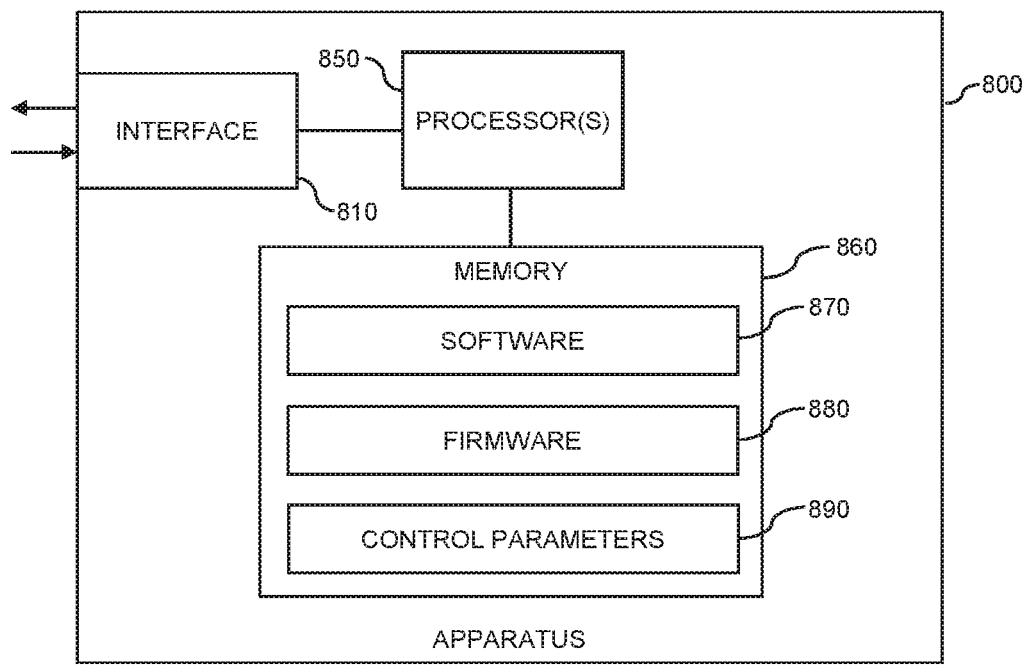
FIG. 8 schematically illustrates structures of an apparatus according to an embodiment of the invention.

FIG. 8 illustrates a processor-based implementation of an apparatus 800 which may be used for implementing radio channel estimation according to the above described concepts. For example, the structures as illustrated in FIG. 8 may be used for implementing the concepts in the above-mentioned access node 100 or in a node communicating with the access node 100.

As illustrated, the apparatus 800 may include an interface 810. The interface 810 could correspond to a radio interface which can be used for the above-mentioned reception of signals by multiple antenna elements. Alternatively, the interface could also be used for receiving samples of signals received by multiple antenna elements from other devices.

Further, the apparatus 800 may include one or more processors 850 coupled to the interface 810 and a memory 860 coupled to the processor(s) 850. By way of example, the interface 810, the processor(s) 850, and the memory 860 could be coupled by one or more internal bus systems of the apparatus 800. The memory 860 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 860 may include software 870, firmware 880, and/or control parameters 890. The memory 860 may include suitably configured program code to be executed by the processor(s) 850 so as to implement the above-described functionalities of a radio channel estimation apparatus, such as explained in connection with FIG. 6.

It is to be understood that the structures as illustrated in FIG. 8 are merely schematic and that the apparatus 800 may actually include further components which, for the sake of clarity, have not been illustrated, e.g., further interfaces or processors. Also, it is to be understood that the memory 860 may include further program code for implementing known functionalities of a access node or base station. According to some embodiments, also a computer program may be provided for implementing functionalities of the apparatus 800, e.g., in the form of a physical medium storing the program code and/or other data to be stored in the memory 860 or by making the program code available for download or by streaming.

As can be seen, the concepts as described above may be used for implementing efficient radio channel estimation on the basis of a reference signal received by a large number of antennas. In particular, the concepts may be used for improved filtering of the received reference signal from a background of noise or interfering signals.

It is to be understood that the examples and embodiments as explained above are merely illustrative and susceptible to various modifications. For example, the illustrated concepts may be applied in connection with various kinds of wireless communication technologies, without limitation to a 5G technology. Further, the concepts may not only be applied in connection with massive MIMO technologies, but also with other multi-antenna technologies. Further, the illustrated concepts may be applied in various kinds of radio devices, including not only network side access nodes or base stations, but also in relay stations or even in terminals. Further, the concepts could also be applied in wireless access points, wireless routers, or wireless adapters for wireless local area networks. Moreover, it is to be understood that the above concepts may be implemented by using correspondingly designed software to be executed by one or more processors of an existing device, or by using dedicated device hardware. Further, it should be noted that the illustrated nodes or apparatuses may each be implemented as a single device or as a system of multiple interacting devices.

The invention claimed is:

1. A method of radio channel estimation, the method comprising:
   obtaining frequency-domain samples of a reference signal received by multiple antenna elements;
   converting the frequency-domain samples to time-domain samples covering different time intervals;
   by removing phase information from the time-domain samples, converting the time-domain samples to corresponding signal strength values;
   for each of the time intervals, summing the signal strength values obtained for the multiple antenna elements;
   based on the summed signal strength values, filtering at least one of the frequency-domain samples and the time-domain samples, wherein filtering at least one of the frequency-domain samples and the time-domain samples comprises:
   based on the summed signal strength values, determining a threshold value; and
   filtering the time-domain samples by selecting the time-domain samples corresponding to those of the time intervals for which the summed signal strength values exceed the threshold value; and
   performing radio channel estimation based on the filtered samples.

2. The method according to claim 1, comprising:
   sorting the summed signal strength values; and
   determining the threshold value as a function of an ordinal rank of the sorted summed signal strength values.

3. The method according to claim 2, comprising:
   determining the threshold value as a linear function of the ordinal rank of the sorted summed signal strength values.

4. The method according to claim 2, comprising:
determining the threshold value on the basis of at least one percentile value of the sorted summed signal strength values.

5. The method according to claim 4, comprising:
determining the threshold value depending on a number of the antenna elements.

6. The method according to claim 1, comprising:
determining the threshold value depending on a minimum value of the summed signal strength values.

7. The method according to claim 1, comprising:
determining a contiguous time-domain filter window which captures the selected time-domain samples.

8. The method according to claim 7, comprising:
determining the time-domain filter window depending on a duration of a cyclic prefix of the reference signal.

9. The method according to claim 7, comprising:
determining the time-domain filter window depending on a number of cyclic shifts of the reference signal.

10. The method according to claim 1, comprising:
determining the signal strength values based on signal power values.

11. The method according to claim 1, comprising:
determining the signal strength values based on signal amplitude values.

12. An apparatus for radio channel estimation, the apparatus being configured to:
obtain frequency-domain samples of a reference signal received by multiple antenna elements;
convert the frequency-domain samples to time-domain samples covering different time intervals;
by removing phase information from the time-domain samples, convert the time-domain samples to corresponding signal strength values;
for each of the time intervals, sum the signal strength values obtained for the multiple antenna elements;
based on the summed signal strength values, filter at least one of the frequency-domain samples and the time-domain samples; and
perform radio channel estimation based on the filtered samples;
wherein, in order to filter at least one of the frequency-domain samples and the time-domain samples, the apparatus is further configured to:
based on the summed signal strength values, determine a threshold value; and
filter the time-domain samples by selecting the time-domain samples corresponding to those of the time intervals for which the summed signal strength values exceed the threshold value.

13. The apparatus according to claim 12, wherein the apparatus is configured to:
sort the summed signal strength values; and
determine the threshold value as a function of an ordinal rank of the sorted summed signal strength values.

14. The apparatus according to claim 13,
wherein the apparatus is configured to determine the threshold value as a linear function of the ordinal rank of the sorted summed signal strength values.

15. The apparatus according to claim 13,
wherein the apparatus is configured to determine the threshold value on the basis of at least one percentile value of the sorted summed signal strength values.

16. The apparatus according to claim 12,
wherein the apparatus is configured to determine the threshold value depending on a number of the antenna elements.

17. The apparatus according to claim 12,
wherein the apparatus is configured to determine the threshold value depending on a minimum value of the summed signal strength values.

18. The apparatus according to claim 12,
wherein the apparatus is configured to determine a contiguous time-domain filter window which captures the selected time-domain samples.

19. The apparatus according to claim 18,
wherein the apparatus is configured to determine the time-domain filter window depending on a duration of a cyclic prefix of the reference signal.

20. The apparatus according to claim 18,
wherein the apparatus is configured to determine the time-domain filter window depending on a number of cyclic shifts of the reference signal.

21. The apparatus according to claim 12,
wherein the apparatus is configured to determine the signal strength values based on signal power values.

22. The apparatus according to claim 12,
wherein the apparatus is configured to determine the signal strength values based on signal amplitude values.

23. A non-transitory computer readable medium comprising instructions executable by at least one processor of a node whereby the node is operable to:
obtain frequency-domain samples of a reference signal received by multiple antenna elements;
convert the frequency-domain samples to time-domain samples covering different time intervals;
by removing phase information from the time-domain samples, convert the time-domain samples to corresponding signal strength values;
for each of the time intervals, sum the signal strength values obtained for the multiple antenna elements;
based on the summed signal strength values, filter at least one of the frequency-domain samples and the time-domain samples; and
perform radio channel estimation based on the filtered samples;
wherein, in order to filter at least one of the frequency-domain samples and the time- domain samples, the node is further operable to:
based on the summed signal strength values, determine a threshold value; and
filter the time-domain samples by selecting the time-domain samples corresponding to those of the time intervals for which the summed signal strength values exceed the threshold value.

\* \* \* \* \*